United States Patent
Yamamoto et al.

(10) Patent No.: US 11,658,388 B2
(45) Date of Patent: May 23, 2023

(54) ELECTRONIC APPARATUS

(71) Applicant: LENOVO (SINGAPORE) PTE. LTD., Singapore (SG)

(72) Inventors: Osamu Yamamoto, Yokohama (JP); Kenji Watamura, Yokohama (JP); Yuichi Onda, Yokohama (JP); Masaharu Yoneda, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 13 days.

(21) Appl. No.: 17/645,808

(22) Filed: Dec. 23, 2021

(65) Prior Publication Data
US 2022/0294097 A1  Sep. 15, 2022

(30) Foreign Application Priority Data
Mar. 12, 2021  (JP) .................................. 202139806

(51) Int. Cl.
| | | |
|---|---|---|
| *H01Q 1/22* | (2006.01) | |
| *H01Q 1/48* | (2006.01) | |
| *H01Q 1/38* | (2006.01) | |
| *G06F 1/16* | (2006.01) | |

(52) U.S. Cl.
CPC ........... *H01Q 1/2266* (2013.01); *G06F 1/169* (2013.01); *G06F 1/1616* (2013.01); *G06F 1/1637* (2013.01); *G06F 1/1662* (2013.01); *H01Q 1/38* (2013.01); *H01Q 1/48* (2013.01)

(58) Field of Classification Search
CPC ... H01Q 1/22; H01Q 1/38; H01Q 1/48; G06F 1/16
See application file for complete search history.

(56) References Cited

U.S. PATENT DOCUMENTS

2016/0041589 A1* 2/2016 Tazbaz .................. H04M 1/022
361/679.06

FOREIGN PATENT DOCUMENTS

| JP | 2001244843 A | 9/2001 |
|---|---|---|
| JP | 2017135514 A | 8/2017 |
| JP | 2018061155 A | 4/2018 |
| JP | 2018121149 A | 8/2018 |

* cited by examiner

*Primary Examiner* — Andrea Lindgren Baltzell
(74) *Attorney, Agent, or Firm* — Shimokaji IP

(57) ABSTRACT

An electronic apparatus includes a storage chassis, an electronic component, an antenna circuit, and a proximity sensor circuit. A pair of main faces facing each other in the thickness direction and end faces of the storage chassis define a storage space. The electronic component is disposed in the storage space. The antenna circuit is disposed in the storage space so that at least a part of the antenna circuit overlaps the electronic component when viewed in the thickness direction. The proximity sensor circuit is connected to the antenna circuit, and detects proximity of an object based on a physical quantity that changes according to proximity of the object. The antenna circuit includes a substrate, an antenna element, and an antenna ground. The proximity sensor circuit is located in an end space defined between the electronic component and the end face.

5 Claims, 7 Drawing Sheets

ELECTRONIC APPARATUS

TECHNICAL FIELD

The present disclosure relates to an electronic apparatus.

BACKGROUND

Some electronic apparatuses such as laptop personal computers (PCs) are equipped with an antenna for wireless communication and a proximity sensor.

SUMMARY

In one aspect of the present disclosure, an electronic apparatus to be placed on a placement surface includes a storage chassis having a pair of main faces facing each other in a thickness direction of the storage chassis and an end face extending from one of the main faces to the other, the main faces and the end face defining a storage space, an electronic component disposed in the storage space, an antenna circuit disposed in the storage space such that at least a part of the antenna circuit overlaps with the electronic component when viewed in the thickness direction, and a proximity sensor circuit connected to the antenna circuit, the proximity sensor circuit being configured to detect proximity of an object based on a physical quantity that changes according to proximity of the object. The antenna circuit includes a substrate, an antenna element disposed on the substrate, and an antenna ground disposed on the substrate and surrounding the antenna element, and the proximity sensor circuit is located in an end space defined between the electronic component and the end face.

DETAILED DESCRIPTION

Figure 1:
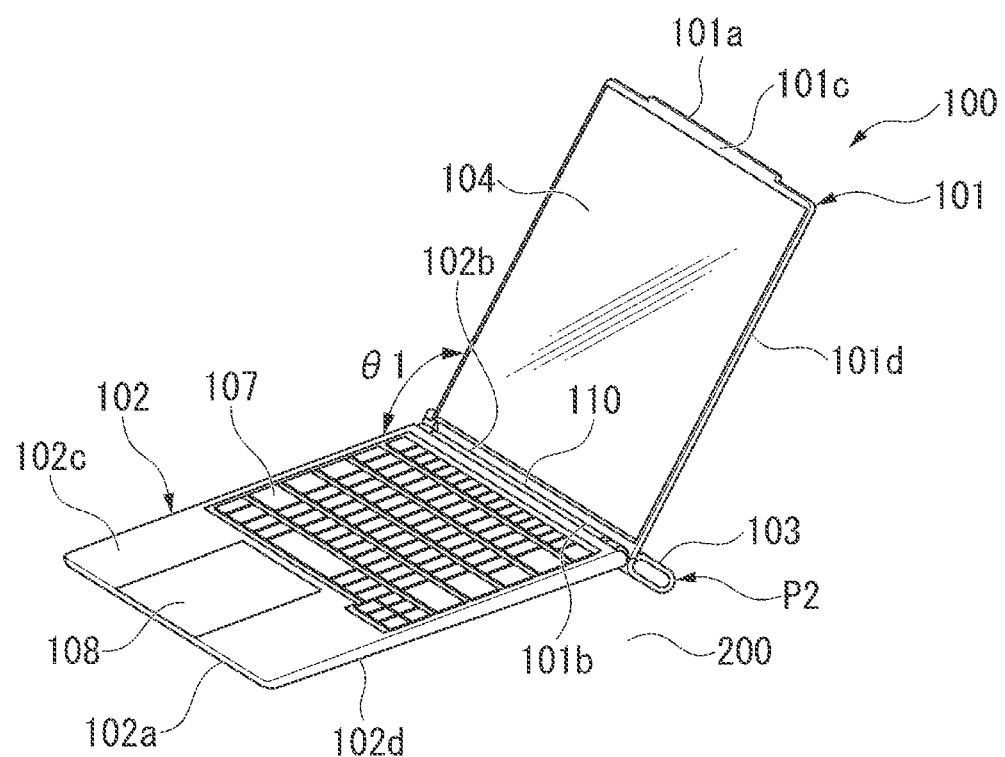
FIG. 1 is a perspective view of an electronic apparatus according to one embodiment.
Figure 2:
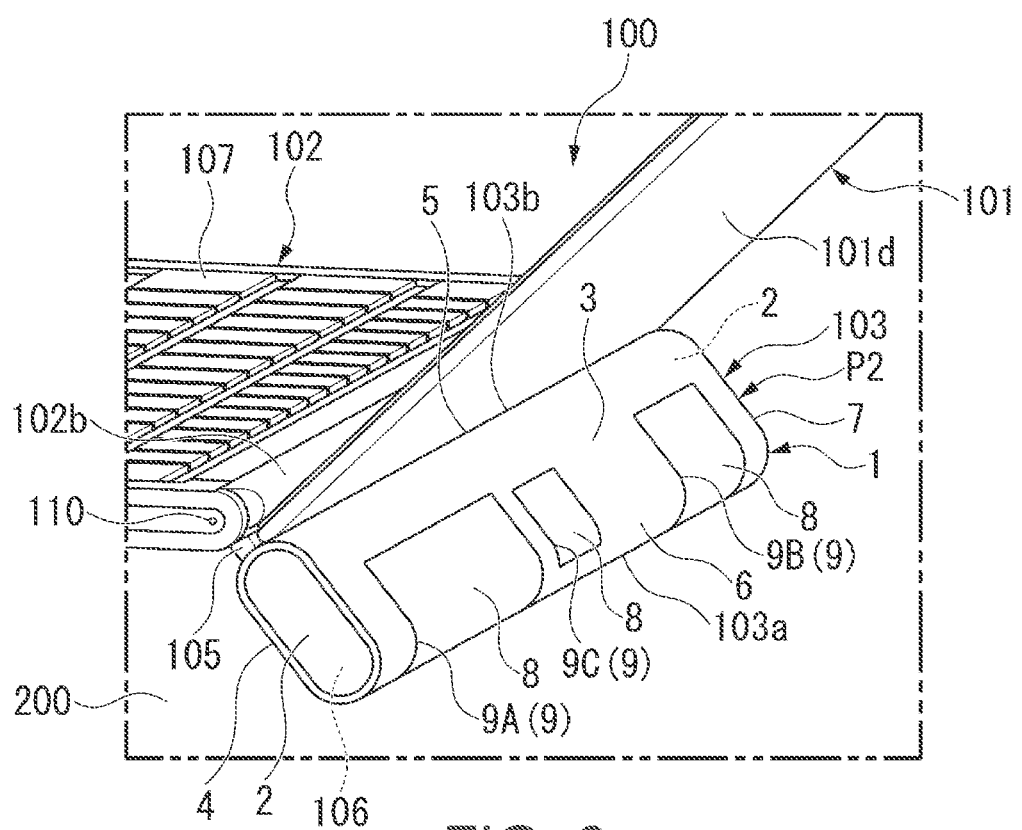
FIG. 2 is a partial perspective view of an electronic apparatus according to one embodiment.
Figure 3:
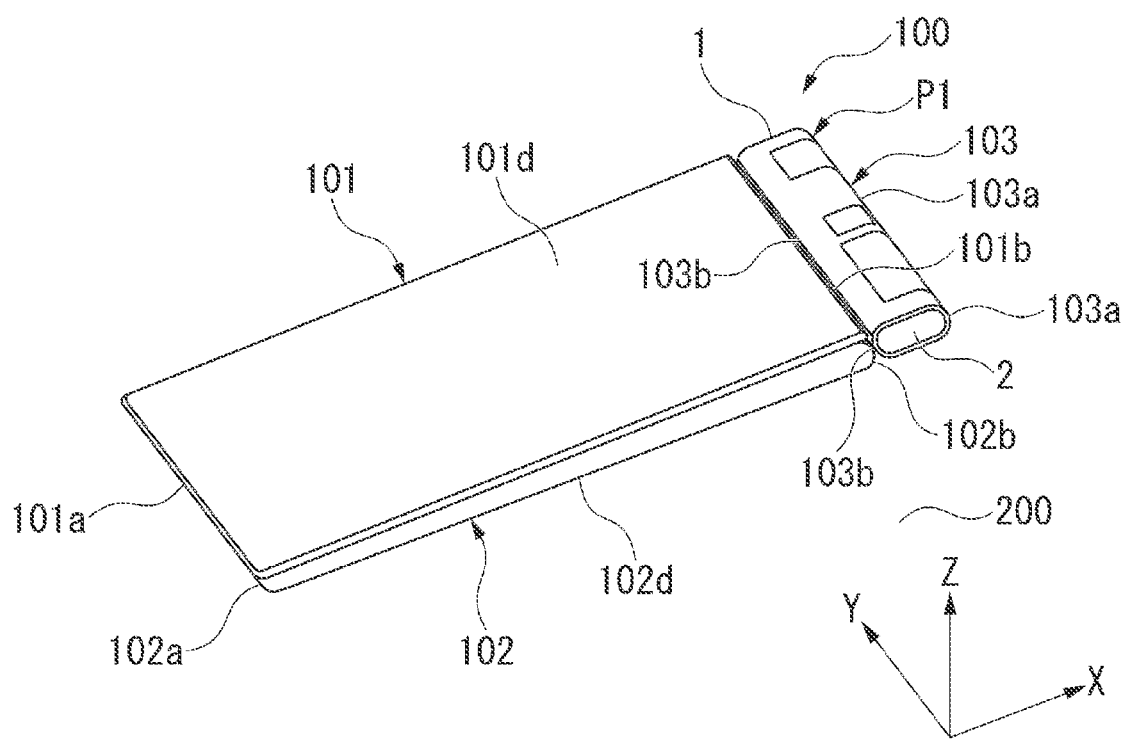
FIG. 3 is a perspective view of an electronic apparatus according to one embodiment.
Figure 4:
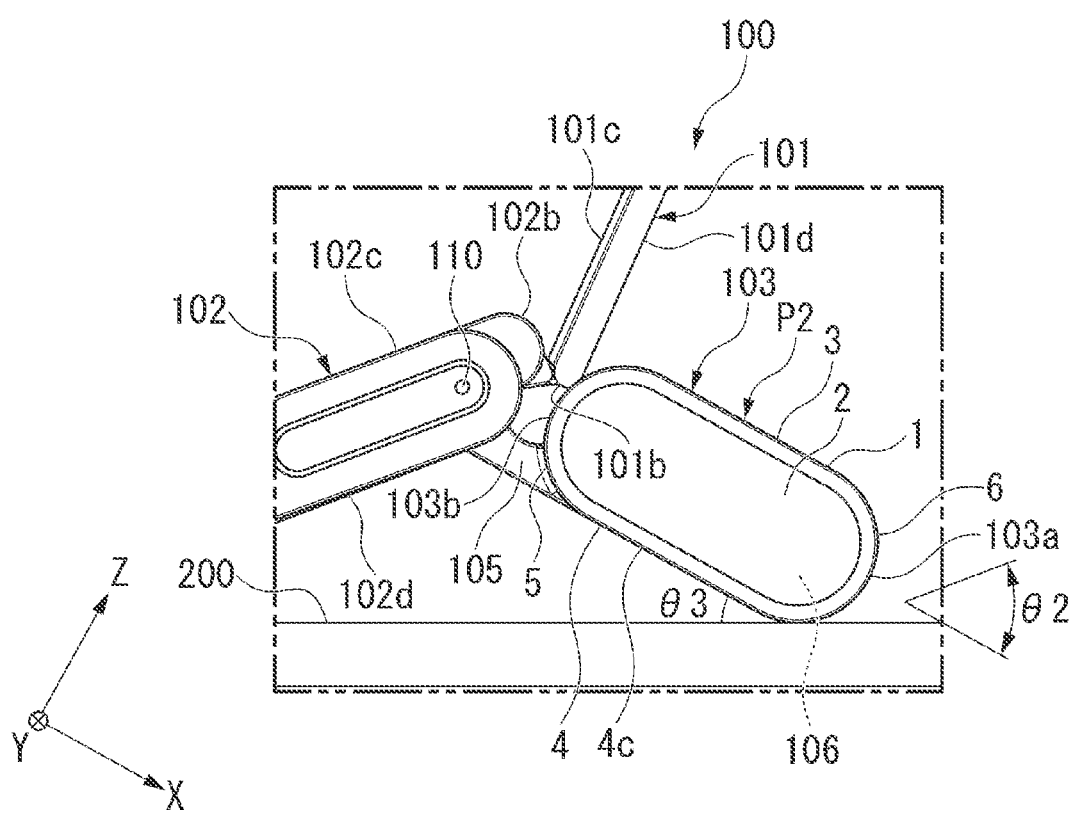
FIG. 4 is a partial side view of an electronic apparatus according to one embodiment.
Figure 5:
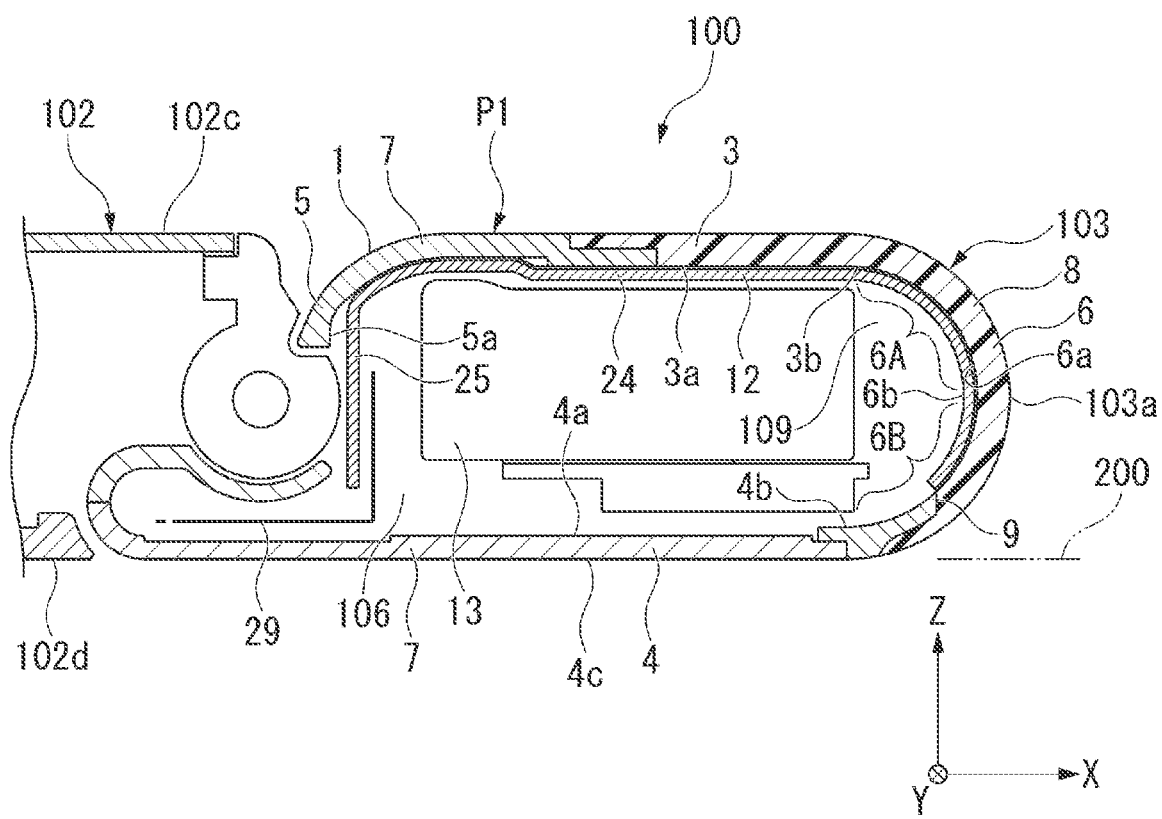
FIG. 5 is a cross-sectional view of a third chassis.

FIG. 1 is a perspective view of an electronic apparatus 100 according to one embodiment. FIG. 1 is a perspective view of the electronic apparatus 100 with the first chassis 101 and the second chassis 102 open. FIG. 2 is a partial perspective view of the electronic apparatus 100. FIG. 3 is a perspective view of the electronic apparatus 100 with the first chassis 101 and the second chassis 102 closed. FIG. 4 is a partial side view of the electronic apparatus 100. FIG. 5 is a cross-sectional view of a third chassis 103. FIG. 5 illustrates a cross-section along X direction and Z direction.

[Electronic Apparatus]

Figure 6:
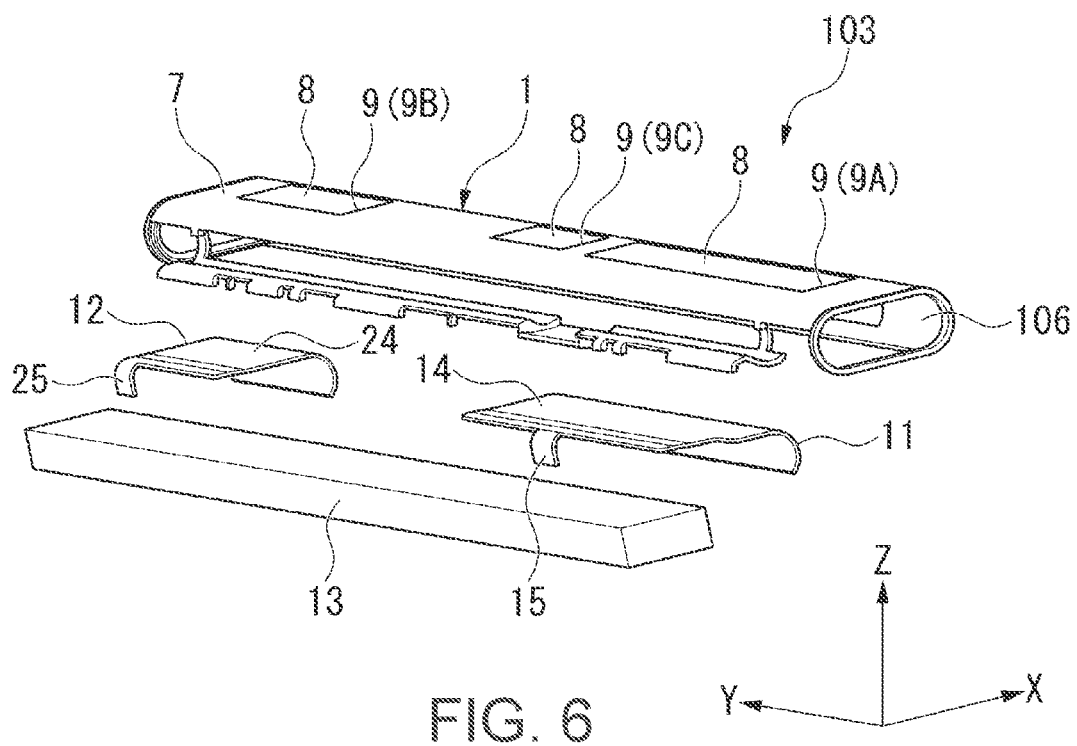
FIG. 6 is an exploded perspective view to illustrate the internal structure of a third chassis.

As illustrated in FIG. 1, the electronic apparatus 100 includes a first chassis 101, a second chassis 102, a third chassis (storage chassis) 103, a first antenna unit 11 (see FIG. 6), a second antenna unit 12 (see FIG. 6), and an electronic component 13 (see FIG. 6). In one example, the electronic apparatus 100 is a laptop personal computer (PC).

The electronic apparatus 100 is placed on a placement surface 200. The second chassis 102 has a second face 102d that faces the placement surface 200. The placement surface 200 may be, for example, a horizontal surface. The material of the placement surface 200 is not particularly limited, and the placement surface 200 may be made of a conductor (e.g., metal).

The first chassis 101 and second chassis 102 are like rectangular plates. The first chassis 101 and the second chassis 102 are connected to each other at their ends via a hinge mechanism 110. The first chassis 101 has a first base end 101b provided with the hinge mechanism 110. The first chassis 101 has a first open end 101a on the opposite side of the first base end 101b. The second chassis 102 has a second base end 102b provided with the hinge mechanism 110. The second chassis 102 has a second open end 102a on the opposite side of the second base end 102b. The second chassis 102 is rotatable relative to the first chassis 101 around the rotary shaft of the hinge mechanism 110. The opening angle θ1 is an angle between a first face 102c of the second chassis 102 and a first face 101c of the first chassis 101. The opening angle θ1 can be selected, for example, in the range of 0° to 180°.

The first chassis 101 has a display 104 placed thereon. In one example, the display 104 is a liquid crystal display or an organic electro-luminescence (EL) display. The first chassis 101 is also called a display chassis. On the first face 101c of the first chassis 101, the display 104 is placed. The first chassis 101 has a second face 101d on the other side of the first face 101c.

The second chassis 102 has a keyboard 107 and a touchpad 108 placed thereon. These keyboard 107 and touchpad 108 are examples of the input devices. The second chassis 102 also houses other devices, such as a battery and storage devices. The second chassis 102 is also called a system chassis.

On the first face 102c of the second chassis 102, the keyboard 107 and the touchpad 108 are placed. The first face 102c faces the display 104 when the opening angle θ1 of the first chassis 101 relative to the second chassis 102 is 0°. The second chassis 102 has a second face 102d on the other side of the first face 102c.

As illustrated in FIG. 2, the third chassis 103 has a rectangular plate shape. The third chassis 103 is connected to the first chassis 101 or the second chassis 102 via a support arm 105. The third chassis 103 has a third base end 103b provided with the support arm 105. The third chassis 103 has a third open end 103a on the opposite side of the third base end 103b. The third chassis 103 is rotatable relative to the second chassis 102 around the rotary shaft of the hinge mechanism 110. The dimension from the third base end 103b to the third open end 103a is smaller than the length of the second chassis 102 from the second base end 102b to the second open end 102a.

As illustrated in FIGS. 1 and 3, the third chassis 103 changes its posture according to the opening angle θ1 of the first chassis 101 relative to the second chassis 102. As illustrated in FIG. 3, where the opening angle θ1 is 0°, the third chassis 103 has the posture extending along the second chassis 102. This posture of the third chassis 103 illustrated in FIG. 3 is called "lying posture P1". The third chassis 103 in the lying posture P1 is almost parallel to the second chassis 102. This means that the third chassis 103 is parallel to the placement surface 200. The third chassis 103 in the lying posture P1 does not support the second chassis 102.

As illustrated in FIG. 1, the angle of the third chassis 103 relative to the second chassis 102 becomes steeper with an increase of the opening angle θ1. The posture of the third chassis 103 illustrated in FIGS. 1, 2 and 4 is called "standing posture P2".

As illustrated in FIG. 4, the inclination angle of the third chassis 103 in the standing posture P2 relative to the second chassis 102 is defined as θ2. In one example, the inclination angle θ2 is an angle between the second face 102d of the second chassis 102 and an outer face 4c of a second main plate 4 of the third chassis 103. In the lying posture P1 (see FIG. 3), the inclination angle θ2 of the third chassis 103 is 0°.

The third chassis 103 in the standing posture P2 is inclined so as to descend from the third base end 103b toward the third open end 103a. In one example, the inclination angle θ2 in the standing posture P2 may be more than 0° and 120° or less. In another example, the inclination angle θ2 may be more than 0° and 90° or less. FIG. 4 illustrates the case of the inclination angle θ2 smaller than 90°.

In one example, the inclination angle θ3 of the third chassis 103 in the standing posture P2 relative to the placement surface 200 is more than 0° and 90° or less. In one example, the inclination angle θ3 is an angle of the outer face 4c of the second main plate 4 relative to the placement surface 200. In the lying posture P1 (see FIG. 3), the inclination angle θ3 of the third chassis 103 is 0°.

In the standing posture P2, the third chassis 103 abuts the placement surface 200 at a second end plate 6 (e.g., the third open end 103a or the vicinity of the third open end 103a). In this posture, the third base end 103b is located above the placement surface 200. The third chassis 103 in the standing posture P2 supports the second chassis 102.

As illustrated in FIG. 1, the second base end 102b of the second chassis 102 is supported by the third chassis 103 in the standing posture P2 to be located above the placement surface 200. The second chassis 102 abuts the placement surface 200 at the second open end 102a or the vicinity of the second open end 102a.

As illustrated in FIGS. 1 and 3, adjustment of the opening angle θ1 of the first chassis 101 relative to the second chassis 102 changes the posture of the third chassis 103 between the lying posture P1 (see FIG. 3) and the standing posture P2 (see FIG. 1).

As illustrated in FIG. 2, the third chassis 103 has a tubular part 1 and a pair of side plates 2. The pair of side plates 2 closes one end and the other end of the tubular part 1.

As illustrated in FIGS. 3 through 5, the following may describe the positional relationship of the components of the third chassis 103 using the XYZ orthogonal coordinate system. X direction extends to connect the third open end 103a and the third base end 103b. X direction is the width direction of the third chassis 103. +X direction is from the third base end 103b to the third open end 103a. Y direction is orthogonal to X direction in the plane along the second main face 4a of the second main plate 4. Y direction is parallel to the central axis of the tubular part 1. Y direction is the length direction of the third chassis 103. Z direction is orthogonal to X direction and Y direction. Z direction is the thickness direction of the third chassis 103 and a storage space 106.

As illustrated in FIG. 4, the third chassis 103 has a racetrack oval shape in a Y direction view. The "racetrack oval shape" include two facing straight lines parallel to each other, and convex curves (e.g., a semicircular shape or an elliptical arc shape) connecting the ends of the two straight lines.

As illustrated in FIG. 5, the tubular part 1 has a first main plate 3, a second main plate 4, a first end plate 5, and a second end plate 6. The first main plate 3 and the second main plate 4 have a rectangular shape whose length direction is in Y direction (see FIG. 2). The first main plate 3 and the second main plate 4 are parallel to each other and face each other. The first main plate 3 and the second main plate 4 have the same shape. When the third chassis 103 is in the lying posture P1, the first main plate 3 is located above the second main plate 4. The inner face of the first main plate 3 is called the first main face (main face) 3a. The inner face of the second main plate 4 is called the second main face (main face) 4a. The first main face 3a and the second main face 4a face each other in Z direction. When the third chassis 103 is in the lying posture P1, the first main face 3a is located farther from the placement surface 200 than the second main face 4a.

As illustrated in FIG. 4, in a Y direction view, the first end plate 5 is a curved convex (e.g., a semicircular shape or an elliptical arc shape) from the −X-direction end of the first main plate 3 to the −X-direction end of the second main plate 4. The first end plate 5 includes the third base end 103b. In a Y direction view, the second end plate 6 is a curved convex (e.g., a semicircular shape or an elliptical arc shape) from the +X-direction end of the first main plate 3 to the +X-direction end of the second main plate 4. The second end plate 6 includes the third base end 103a. FIG. 4 illustrates the first end plate 5 and the second end plate 6 having semicircular shapes that are convex in the directions away from each other.

As illustrated in FIG. 5, the inner face of the first end plate 5 is called a first end face 5a. The first end face 5a extends from the −X-direction end of the first main face 3a to the −X-direction end of the second main face 4a. The inner face of the second end plate 6 is called a second end face 6a. The second end face 6a extends from the +X-direction end of the first main face 3a to the +X-direction end of the second main face 4a. The second end face 6a is an example of an "end face".

Reference numeral 6b denotes the midpoint of the second end face 6a viewed in Y direction. The midpoint 6b corresponds to the apex of the oval shape defined by the inner face of the tubular part 1 viewed in Y direction. A section from the +X direction end 3b of the first main face 3a to the midpoint 6b is called a first section 6A. A section from the midpoint 6b to the +X direction end 4b of the second main face 4a is called a second section 6B.

As illustrated in FIGS. 2 and 5, the tubular part 1 includes a body 7 and a radio-wave transmission plate 8. In one example, the body 7 is made of metal. The body 7 has a plurality of windows (openings) 9. These windows 9 are located from the first main plate 3 to the second end plate 6.

As illustrated in FIG. 2, the plurality of windows 9 include a first window 9A, a second window 9B, and a third window 9C. In Y direction, the first window 9A covers the range of the first antenna unit 11 (see FIG. 6). In Y direction, the second window 9B covers the range of the second antenna unit 12 (see FIG. 6).

The radio-wave transmission plates 8 are placed corresponding to the plurality of windows 9. The radio-wave transmission plates 8 are made of a non-conductor such as resin. The radio-wave transmission plates 8 transmit radio waves. The radio-wave transmission plates 8 close the windows 9. The radio-wave transmission plates 8 prevent foreign objects from entering the third chassis 103 through the windows 9.

As illustrated in FIG. 5, the storage space 106 is an internal space of the third chassis 103. The storage space 106 is defined by the first main face 3a, the second main face 4a, the first end face 5a, and the second end face 6a.

FIG. 6 is an exploded perspective view to illustrate the internal structure of the third chassis 103. As illustrated in FIG. 6, the storage space 106 stores the first antenna unit 11, the second antenna unit 12, and the electronic component 13.

In one example, the first antenna unit 11 is a flexible printed circuit (FPC) board. The first antenna unit 11 includes a body 14 and an extension 15 extending from the body 14.

In one example, the electronic component 13 is a speaker. As illustrated in FIG. 5, at least a part of the electronic component 13 is located between the first main face 3a and the second main face 4a. In this embodiment, the width (X-direction dimension) of the electronic component 13 is approximately equal to the width (X-direction dimension) of the first main face 3a and the second main face 4a. The electronic component 13 is not limited to a speaker, which may be other devices, including other types of acoustic devices and sensor devices.

Figure 7:
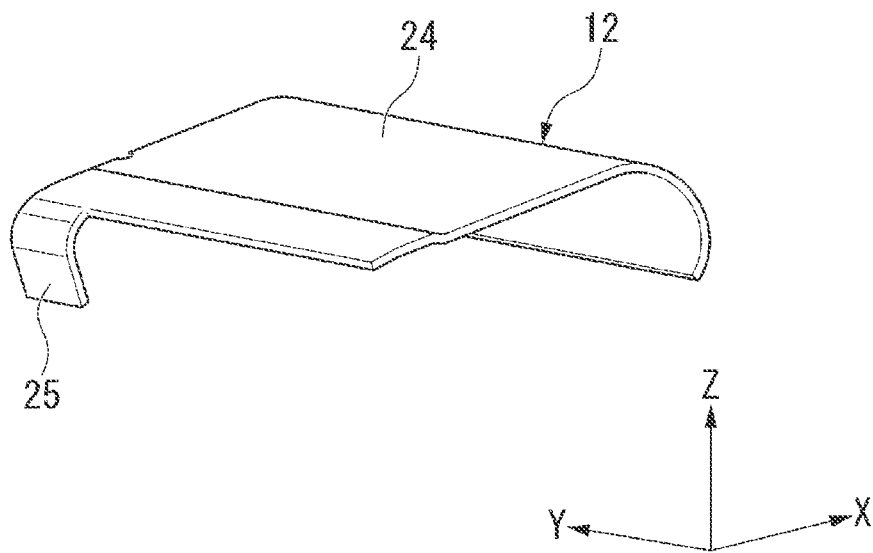
FIG. 7 is a perspective view of a second antenna unit.
Figure 8:
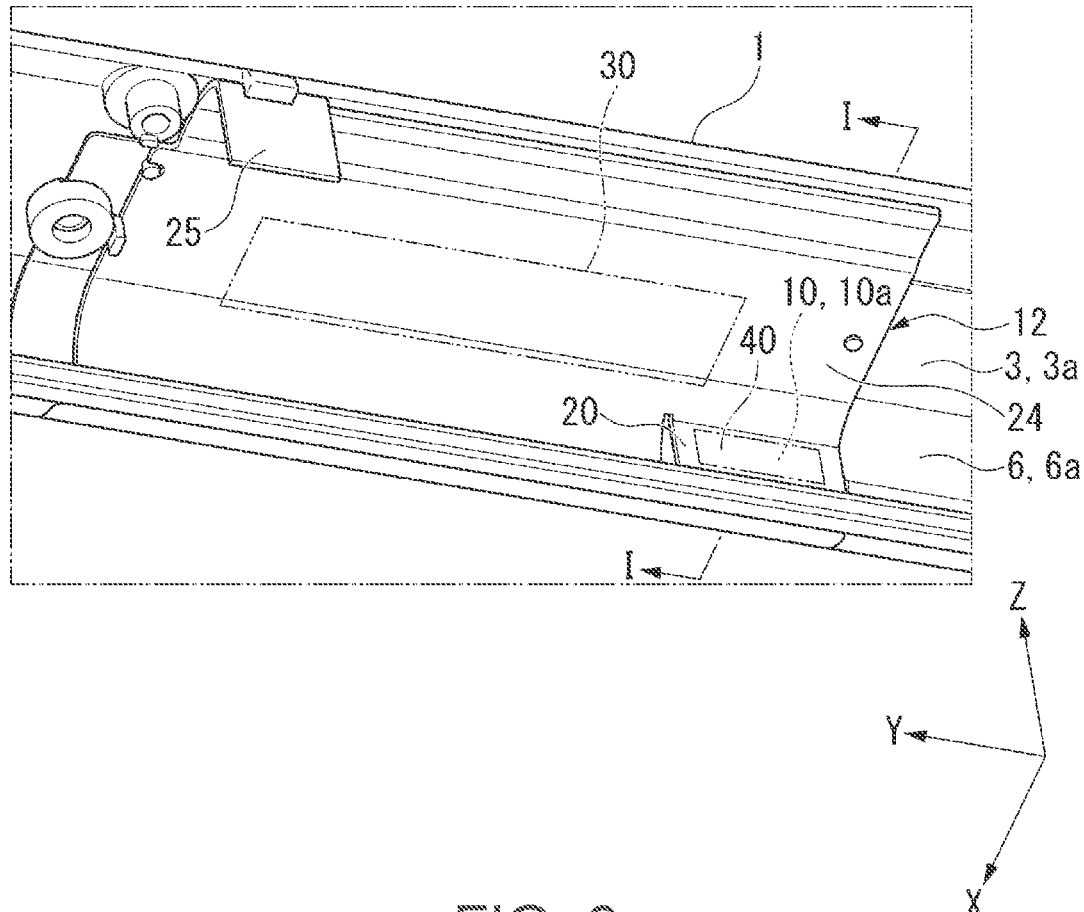
FIG. 8 is a perspective view of a second antenna unit and a part of a tubular part.
Figure 9:
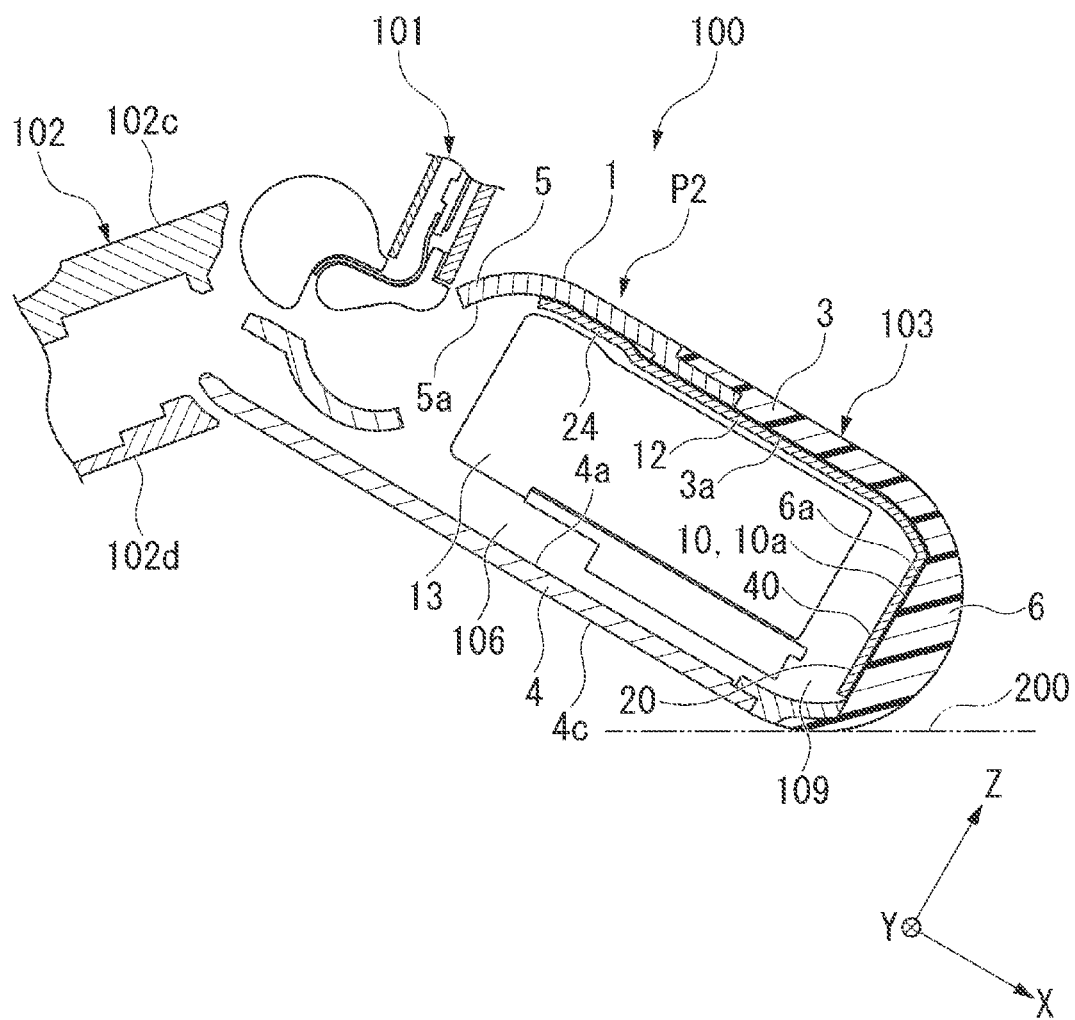
FIG. 9 is a cross-sectional view of a third chassis.

FIG. 7 is a perspective view of the second antenna unit 12. FIG. 8 is a perspective view of the second antenna unit 12 and a part of the tubular part 1. FIG. 9 is a cross-sectional view of the third chassis 103. FIG. 9 is a cross-sectional view taken along the arrows I-I of FIG. 8.

As illustrated in FIGS. 8 and 9, the second end face 6a of the second end plate 6 has a thick part 10 on a part thereof. In the thick part 10, the second end plate 6 is thicker than the other part and bulges inward. The inner face 10a of the thick part 10 has a flat surface along Y- and Z-directions. The thick part 10 is formed at a part of the tubular part 1 in the length direction (Y direction). The inner face 10a of the thick part 10 is a part of the second end face 6a.

As illustrated in FIG. 9, the second end face 6a of the second end plate 6 and the electronic component 13 define a space therebetween, and this space is called an end space 109. The end space 109 is defined by the second end face 6a and the +X-direction end face of the electronic component 13.

As illustrated in FIG. 7, the second antenna unit 12 is a flexible printed circuit (FPC) board, for example. The second antenna unit 12 is formed like a sheet, and has flexibility. The second antenna unit 12 has a body 24 and an extension 25. The body 24 is substantially rectangular in shape. The extension 25 is a tab-like portion extending from the −X-direction end of the body 24. The extension 25 is located at a position that includes the +Y-direction end of the body 24.

As illustrated in FIGS. 5 and 8, the second antenna unit 12 extends along the inner face of the tubular part 1. The second antenna unit 12 extends from the first main face 3a to the second end face 6a. The second antenna unit 12 may be in contact with the first main face 3a and the second end face 6a, or it may be away from the first main face 3a and the second end face 6a.

As illustrated in FIGS. 8 and 9, the second antenna unit 12 has a rectangular section 20 including the −Y-direction end thereof, and the section 20 overlaps the inner face 10a of the thick part 10.

Figure 10:
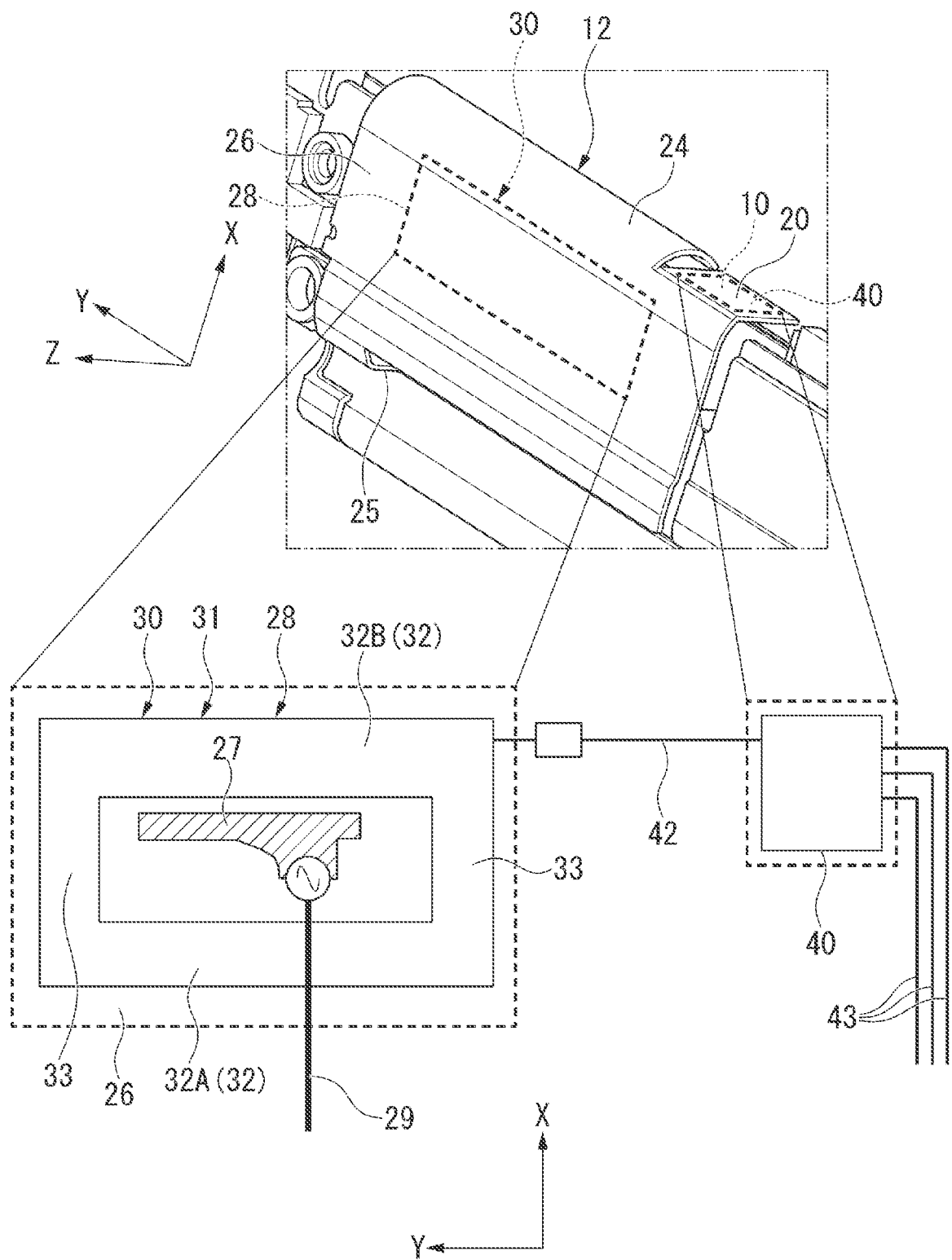
FIG. 10 is a perspective view of a second antenna unit, illustrating the structure of the unit.

FIG. 10 is a perspective view of the second antenna unit 12, illustrating the structure of the unit. As illustrated in FIG. 10, the second antenna unit 12 has a base film (substrate) 26, an antenna circuit 30, and a proximity sensor circuit 40. In one example, the base film 26 is made of resin such as polyimide. The base film 26 has flexibility. The second antenna unit 12 may have a coverlay (not illustrated) that covers the antenna circuit 30 and the proximity sensor circuit 40.

The antenna circuit 30 includes an antenna element 27 and an antenna ground 28. The antenna element 27 and antenna ground 28 are formed on one face of the base film 26. In one example, the antenna element 27 and the antenna ground 28 are metal layers (conductor layers) made of copper foil. In one example, the antenna circuit 30 extends from the first main face 3a to the second end face 6a (first section 6A) (see FIG. 5). At least a part of the antenna circuit 30 is located along the first main face 3a. The part of the antenna circuit 30 that overlaps the first main face 3a also overlaps the electronic component 13.

The antenna element 27 has a pattern for transmitting and receiving radio waves. In one example, the antenna element 27 extends from the first main face 3a to the second end face 6a (first section 6A) (see FIG. 5). That is, the antenna element 27 is located at a position overlapping the first main face 3a and the second end face 6a (first section 6A) (see FIG. 5). The antenna element 27 is electrically connected to an antenna cable 29 (see FIG. 5) at the extension 25. The antenna element 27 is connected to a communication circuit (not illustrated) in the second chassis 102 via the wiring of the second antenna unit 12 and the antenna cable 29. In one example, the antenna cable 29 is a coaxial cable.

The antenna ground 28 has rectangular frame wiring 31. The frame wiring 31 includes a pair of main wiring parts 32 and a pair of side wiring parts 33. The main wiring parts 32 are substantially in Y direction. The main wiring parts 32 face each other with an interval in X direction.

Of the main wiring parts 32, a part 32 closer to the third base end 103b (see FIG. 4) is called a "first main wiring part 32A". Of the main wiring parts 32, a part 32 closer to the third open end 103a (see FIG. 4) is called a "second main wiring part 32B".

The side wiring parts 33 face each other with an interval in Y direction.

The frame wiring 31 surrounds the antenna element 27. In other words, the antenna element 27 is located inside the frame wiring 31. This means that the antenna element 27 is placed between the pair of main wiring parts 32. The antenna element 27 is placed between the pair of side wiring parts 33. The antenna element 27 is located with an interval from the frame wiring 31.

Figure 11:
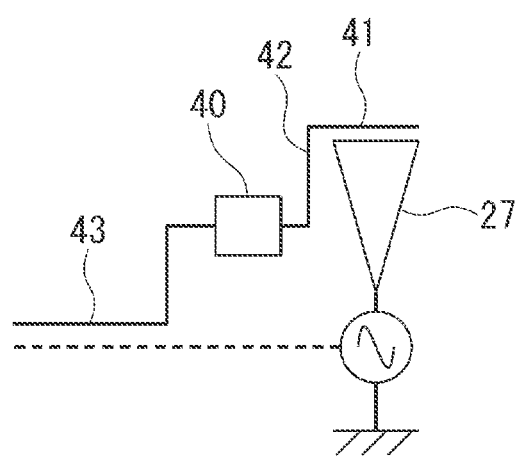
FIG. 11 is a schematic diagram of a proximity sensor circuit.

FIG. 11 is a schematic diagram of the proximity sensor circuit 40. As illustrated in FIG. 11, the proximity sensor circuit 40 includes a sensing element 41 configured to detect the proximity of an object based on a physical quantity that changes according to the proximity of the object. In one example, the proximity sensor circuit 40 is a capacitance sensor. The capacitance sensor detects capacitance as a physical quantity.

As illustrated in FIG. 10, the proximity sensor circuit 40 is connected to the sensing element 41 via analog wiring 42. The proximity sensor circuit 40 uses the antenna element 27 that functions as the sensing element 41 to detect the capacitance. The proximity sensor circuit 40 sends a detection signal according to the detected physical quantity to a controller (not illustrated) through the wiring 43.

The proximity sensor circuit is not limited to the capacitance sensor, which may be an inductive sensor.

The proximity sensor circuit 40 is located in the section 20 of the second antenna unit 12. That is, the proximity sensor circuit 40 is located in the end space 109 (see FIG. 9), which is the space defined between the second end face 6*a* of the second end plate 6 and the electronic component 13.

As illustrated in FIG. 4, when the third chassis 103 is in the standing posture P2, the third base end 103*b* is located higher than the third open end 103*a*. In this case, the main wiring parts 32 illustrated in FIG. 10 have different height positions relative to the placement surface 200. Specifically, the first main wiring part 32A is located higher than the second main wiring part 32B. In other words, the first main wiring part 32A has a greater distance from the placement surface 200 than the second main wiring part 32B.

[How to Use Electronic Apparatus]

As illustrated in FIG. 3, where the opening angle θ1 is 0°, the third chassis 103 has the posture (lying posture P1) extending along the second chassis 102. In this posture, the second and third chassis 102 and 103 are along the placement surface 200. The third chassis 103 does not support the second chassis 102.

As illustrated in FIGS. 1 and 4, as the opening angle θ1 increases, the third chassis 103 becomes steeper relative to the second chassis 102 to have the standing posture P2. The third chassis 103 in the standing posture P2 supports the second chassis 102. As illustrated in FIG. 4, the third chassis 103 abuts the placement surface 200 at the second end plate 6.

[Advantageous Effects of Electronic Apparatus of One Embodiment]

As illustrated in FIG. 9, the proximity sensor circuit 40 of the electronic apparatus 100 is placed in the end space 109 between the electronic component 13 and the second end face 6*a*. The proximity sensor circuit 40 is placed so as not to overlap the electronic component 13, and this makes it easy to keep a space in the thickness direction of the third chassis 103. Due to less restriction on the thickness dimension of the electronic component 13, a large electronic component 13 having excellent performance (e.g., a large speaker having excellent acoustic performance) can be used.

As illustrated in FIG. 10, the antenna element 27 of the antenna circuit 30 is surrounded by the antenna ground 28. This reduces the electromagnetic influence from the proximity sensor circuit 40 to the antenna element 27. This means that the transmission/reception performance of the antenna circuit 30 is less adversely affected.

The electronic apparatus 100 therefore keeps sufficient performance of the electronic component 13 while keeping the transmission/reception performance of the antenna circuit 30.

In the electronic apparatus 100, the end space 109 to place the proximity sensor circuit 40 is adjacent to the electronic component 13 (see FIG. 9). At least a part of the antenna circuit 30 (see FIG. 10) overlaps the electronic component 13. This means that the proximity sensor circuit 40 and the antenna circuit 30 can be placed to be close to each other. The analog wiring 42 therefore can be shortened. This suppresses analog noise and enhances the transmission/reception performance of the antenna circuit 30.

In the electronic apparatus 100, the antenna element 27 is placed between the pair of main wiring parts 32 of the antenna ground 28 (see FIG. 10). When the third chassis 103 is in the standing posture P2, the first main wiring part 32A of the main wiring parts 32 is located higher than the second main wiring part 32B. This means that the first main wiring part 32A is located higher than the antenna element 27, and the second main wiring part 32B is located lower than the antenna element 27.

In this way, the second main wiring part 32B of the electronic apparatus 100 is located lower than the antenna element 27. This reduces the electromagnetic influence from the placement surface 200, which may be made of a conductor (e.g., metal), on the antenna element 27. Further, the first main wiring part 32A is located higher than the antenna element 27. This reduces the electromagnetic influence from the first chassis 101 on the antenna element 27. Thus, this configuration enhances the transmission/reception performance of the antenna element 27.

As described above, the antenna element 27 extends from the first main face 3*a* to the second end face 6*a* (first section 6A) (see FIG. 5). Compared to the third chassis 103 in the lying posture P1 (see FIG. 3), at least a portion of the first section 6A is close to the placement surface 200 when the third chassis 103 is in the standing posture P2 (see FIG. 4). This means that at least a part of the antenna element 27 approaches the placement surface 200 as the third chassis 103 shifts from the lying posture P1 to the standing posture P2.

In the electronic apparatus 100, the antenna element 27 is placed between the pair of main wiring parts 32 (see FIG. 10). Although the antenna element 27 is closer to the placement surface 200 as the third chassis 103 shifts from the lying posture P1 to the standing posture P2, this configuration reduces the electromagnetic influence from the placement surface 200. This configuration therefore enhances the transmission/reception performance of the antenna element 27.

In the electronic apparatus 100, the antenna element 27 extends from the first main face 3*a* to the second end face 6*a* (first section 6A). This enhances the transmission/reception performance of the antenna element 27 as compared to the configuration of the antenna element 27 extending from the second main face 4*a* to the second end face 6*a*.

It enhances the transmission/reception performance of the antenna element 27 for the following reasons. If a part of the antenna element 27 is on the second main face 4*a*, the radio waves transmitted and received by the antenna element 27 pass near the electronic component 13. These radio waves may be affected by the electronic component 13. In contrast, if a part of the antenna element 27 is on the first main face 3*a*, the radio waves transmitted and received by the antenna element 27 will be less affected by other electronic components. This configuration therefore enhances the transmission/reception performance of the antenna element 27.

In the electronic apparatus 100, the antenna element 27 is surrounded by the frame wiring 31 made up of the pair of main wiring parts 32 and the pair of side wiring parts 33. This configuration reduces the electromagnetic influence not only from the vertical direction but also from the lateral. Thus, this configuration enhances the transmission/reception performance of the antenna element 27 better.

The proximity sensor circuit 40 is connected to the antenna circuit 30. The proximity sensor circuit 40 uses the antenna circuit 30 to detect capacitance. This therefore simplifies the structure of the proximity sensor.

The specific configuration of the present disclosure is not limited to the above-described embodiments, and also includes designs or the like within the scope of the present disclosure. The configurations described in the above embodiments can be combined freely.

The proximity sensor circuit 40 illustrated in FIG. 10 detects the capacitance using the antenna circuit 30. The configuration of the proximity sensor circuit is not particularly limited. For example, the second antenna unit may be provided with a sensing element separately. This sensing element may be included in the antenna circuit.

The antenna ground 28 illustrated in FIG. 10 has the frame wiring 31 surrounding the antenna element 27, and the shape of the antenna ground is not particularly limited as long as the antenna ground has at least a pair of main wiring parts and these main wiring parts are located at positions higher and lower than the antenna element when the third chassis in the standing posture. Therefore, one or both of side wiring parts of the antenna ground may be omitted.

The invention claimed is:

1. An electronic apparatus configured to be placed on a placement surface, comprising:
    a storage chassis having a pair of main faces facing each other in a thickness direction of the storage chassis and an end face extending from one main face to the other main face, the main faces and the end face defining a storage space;
    an electronic component disposed in the storage space;
    an antenna circuit disposed in the storage space whereby at least a part of the antenna circuit overlaps with the electronic component in the thickness direction; and
    a proximity sensor circuit connected to the antenna circuit, the proximity sensor circuit configured to detect proximity of an object based on a physical quantity that changes according to proximity of the object, wherein
    the antenna circuit includes
        a substrate,
        an antenna element disposed on the substrate, and
        an antenna ground disposed on the substrate and surrounding the antenna element, and
    the proximity sensor circuit is located in an end space defined between the electronic component and the end face.

2. The electronic apparatus according to claim 1 further comprising:
    a first chassis including a display; and
    a second chassis rotatably connected to the first chassis, wherein
    the storage chassis is rotatably connected to the first chassis or the second chassis, the storage chassis is configured to shift between a standing posture and a lying posture according to an opening angle between the first chassis and the second chassis, wherein in the standing posture, the storage chassis abuts the placement surface to support the second chassis, wherein in the lying posture, the storage chassis does not support the second chassis, and
    wherein, when the storage chassis shifts from the lying posture to the standing posture, at least a part of the antenna element approaches the placement surface.

3. The electronic apparatus according to claim 2, wherein at least a part of the antenna element overlaps the end face.

4. The electronic apparatus according to claim 2, wherein the pair of main faces are a first main face and a second main face, the first main face is higher than the second main face when the storage chassis is in the lying posture, and
    at least a part of the antenna element extends from the first main face to the end face.

5. The electronic apparatus according to claim 1, wherein the proximity sensor circuit is connected to the antenna ground.

\* \* \* \* \*